June 12, 1962

W. MOERMAN 3,038,989

STUD WELDING

Filed Dec. 6, 1956

INVENTOR.
WILLEM MOERMAN.
BY
AGENT.

United States Patent Office 3,038,989
Patented June 12, 1962

3,038,989
STUD WELDING
Willem Moerman, Eindhoven, Netherlands, assignor, by mesne assignments, to North American Philips Company, Inc., New York, N.Y., a corporation of Delaware
Filed Dec. 6, 1956, Ser. No. 626,744
Claims priority, application Netherlands Dec. 13, 1955
4 Claims. (Cl. 219—99)

The invention relates to a method of stud welding a metal member to a metal surface and to a combination of a stud and slag-forming member for use in such welding.

In the present stud welding method a slag-forming electrically conductive body is arranged between the stud end and the metal surface to be welded together. Thereafter, an electric arc is struck and after a certain period of time a sufficient amount of liquid metal is produced to permit the stud end to be moved towards and joined to the metal surface. To achieve the above, a slag-forming member with a continuous cavity is used whereby the stud is moved through the cavity in the member when the latter is sufficiently melted and toward the metal surface.

An object of the present invention is the provision of an enlarged stud head. The stud head may assume a variety of shapes, for example, flat, round, tapered etc.

A further object of the present invention is to provide a slag-forming member of refractory ceramic material which is locally coated with a metal layer so that an electric connection is established between the stud end and the metal surface.

Another object of the present invention is to widen the cavity aperture of the slag-forming member which is remote from the stud head in order to accommodate slag and excessive weld metal. In addition, the side of the slag-forming member receiving the stud head is countersunk in order to provide a seat for correctly centering the stud head.

The above and other features, objects and advantages of the present invention will be fully understood from the following description considered in connection with the accompanying illustrative drawings.

Figure 1:
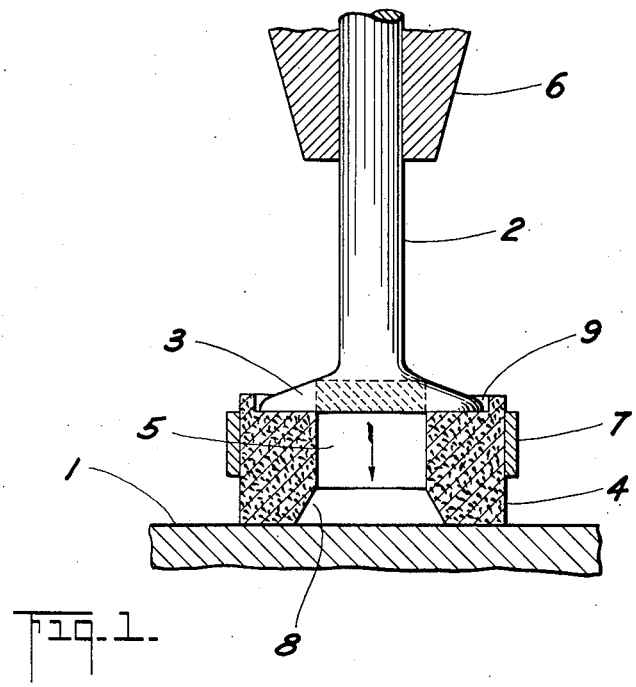
Figure 2:
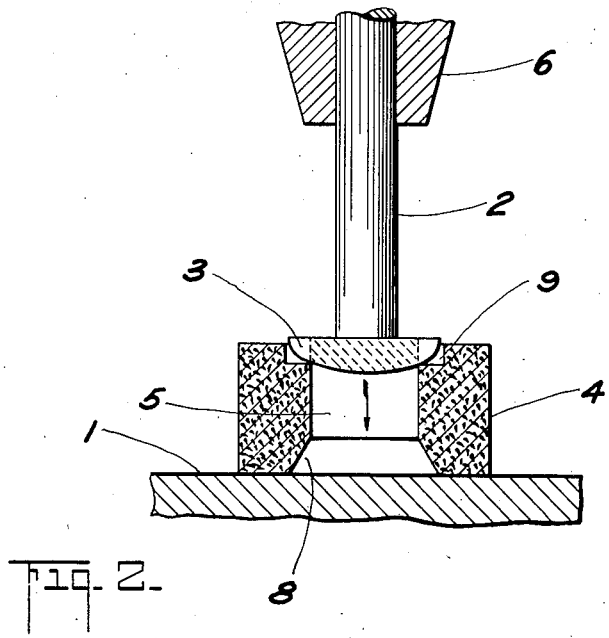

FIG. 1 is a side elevation view, partly in section, of the novel stud welding device constructed in accordance with the present invention, FIG. 2 is a modification of the device shown in FIG. 1.

Referring to the drawing, a metal plate 1 is illustrated having a slag-forming member 4 which is here shown in an annular form. Member 4 is provided with a continuous cavity 5 having a widened portion 8 on one end and a countersunk portion 9 on the opposite end thereof. A stud 2 to be welded to metal plate 1 is provided with an enlarged head 3. In FIG. 1 the head 3 is shown flat while in FIG. 2 it is rounded. The head 3 is seated in countersunk portion 9 of the member 4 so that the head is always correctly centered. It should be noted that the diameter of cavity 5 is greater than the diameter of the stud 2 but less than the diameter of the head 3.

Slag-forming member 4 is constituted of a refractory ceramic material which is locally coated with a metal layer so that an electrical connection is made between the stud end and the metal surface. An example of the components of the member 4 are: bentonite, 25%; ferromanganese 15%; $TiO_{1.98}$ (electro-conductive titanium oxide) 60%. In this composition the ferromanganese may have silicomanganese or a mixture of ferrosilicon and ferromanganese substituted for it. In addition other reducing alloys such as ferrotitanium may be added having percentages of the total composition between 4% and 25%. The member 4 may contain other well-known components of slag-forming compositions such as calcium fluoride and calcium carbonate and if the member is electro-conductive then iron powder may be used in place of electro-conductive titanium oxide. Bentonite permits the member to be made by extrusion because of its shaping characteristics, however kaolin may be used instead of bentonite.

The stud 2 is secured in a stud holder 6 which is connected to one terminal of a voltage supply, the other terminal of which is connected to plate 1. The member 4 is further provided with a collar 7 which is clamped around the member 4 and prevents the latter from prematurely disintegrating when the member is cracked due to arc heat. The shaded part of the head 3 is the part thereof which becomes molten in order to permit passage of the stud 2 through the cavity 5 at the proper time and in the direction of the arrow. This part of the head together with the adjacent part of plate 1 melts under the action of arc heat to form the weld metal which establishes the weld joint.

FIG. 2 shows an arrangement of elements similar to FIG. 1 in which like parts are denoted by the same reference numerals. However, the stud head 3 is rounded yet fits precisely in the countersunk portion 9. It should be apparent that slag and excessive weld metal is forced into widened portion 8 of the cavity 5 when the stud 2 is pressed into engagement with metal plate 1.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. A method of welding to a metallic workpiece, a stud having a rod-shaped portion and a flange-shaped end portion of greater diameter, the steps of placing upon the workpiece an electrically-conductive member having a continuous cavity with a cross-sectional area greater than that of the rod-shaped portion and less than that of the end portion, arranging the stud with the end surface of the flange-shaped portion engaging a portion of the surface of the electrically-conductive member surrounding the cavity, striking an arc between the stud and workpiece to melt part of the end portion in the vicinity of the cavity, and pressing the rod-shaped portion through the cavity toward the workpiece.

2. In stud welding, the combination of a metallic workpiece, an electrically-conductive member on said workpiece and provided with a continuous cavity, and a stud adapted to be welded to said workpiece and having a rod-shaped portion and flange-shaped end portion resting upon the surface of said electrically-conductive member surrounding the cavity, the cross-sectional area of said cavity being greater than that of said rod-shaped portion and being less than that of the flange-shaped portion.

3. In stud welding, the combination of a metallic workpiece, an electrically-conductive member on said workpiece and provided with a cylindrical bore, and a stud adapted to be welded to said metallic member and having a flange-shaped end portion with a convex surface engaging the edge of said bore, the cross-sectional area of said bore being greater than that of said rod-shaped portion and being less than that of said flange-shaped portion.

4. The combination defined in claim 2 in which the electrically-conductive member comprises a body of ceramic material provided locally with a metal coating.

References Cited in the file of this patent
UNITED STATES PATENTS

| | | |
|---|---|---|
| 1,978,318 | Miller | Oct. 23, 1934 |
| 2,509,999 | Van Der Willigen et al. | May 30, 1950 |
| 2,510,000 | Van Der Willigen et al. | May 30, 1950 |